March 22, 1966     O. A. HALEY     3,241,818
APPARATUS FOR SELECTIVELY ADJUSTABLY MEASURING THE
VOLUME OF A PLURALITY OF MATERIALS
Filed Aug. 27, 1962     2 Sheets-Sheet 1
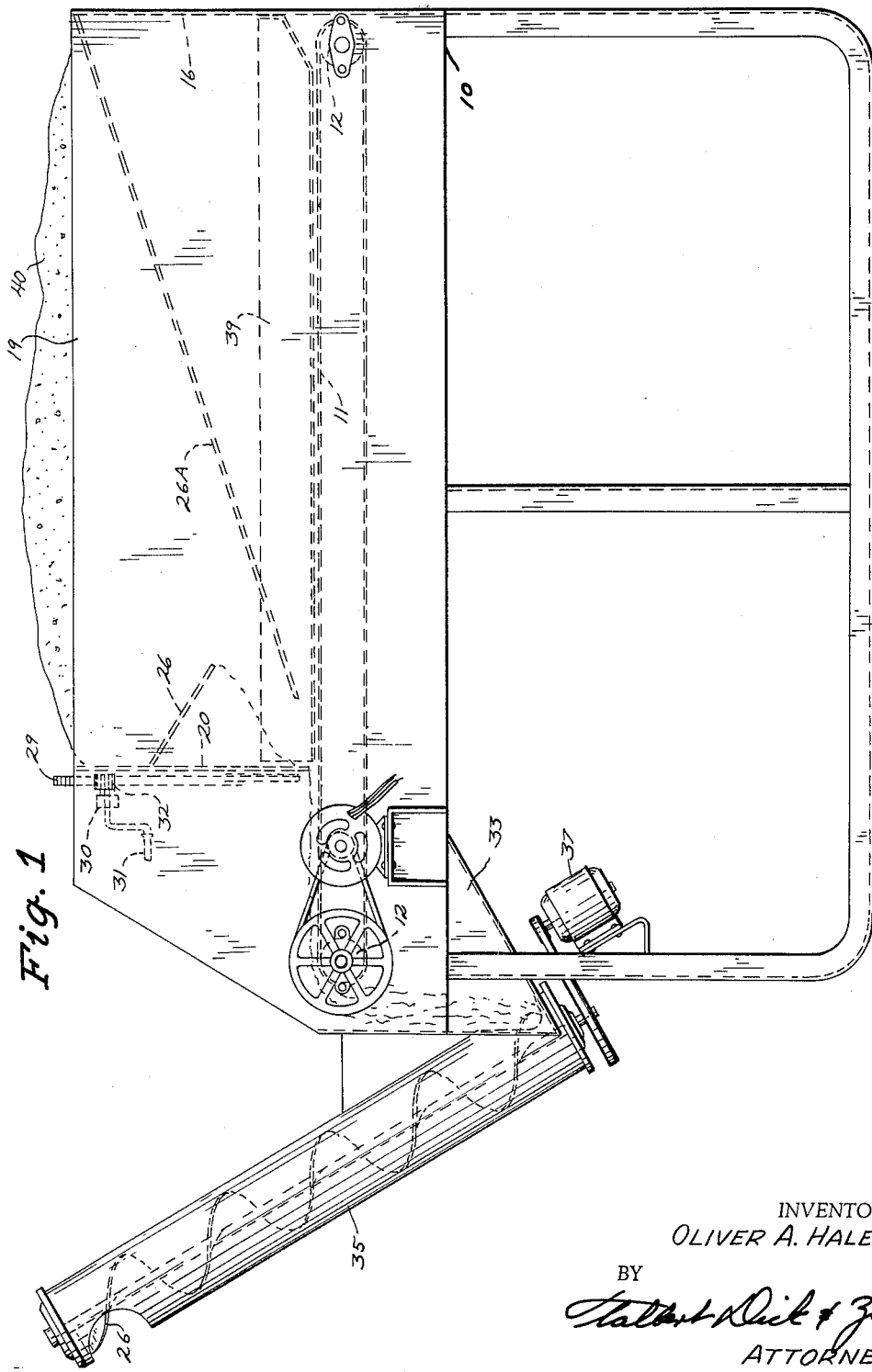
INVENTOR.
OLIVER A. HALEY
BY
ATTORNEYS

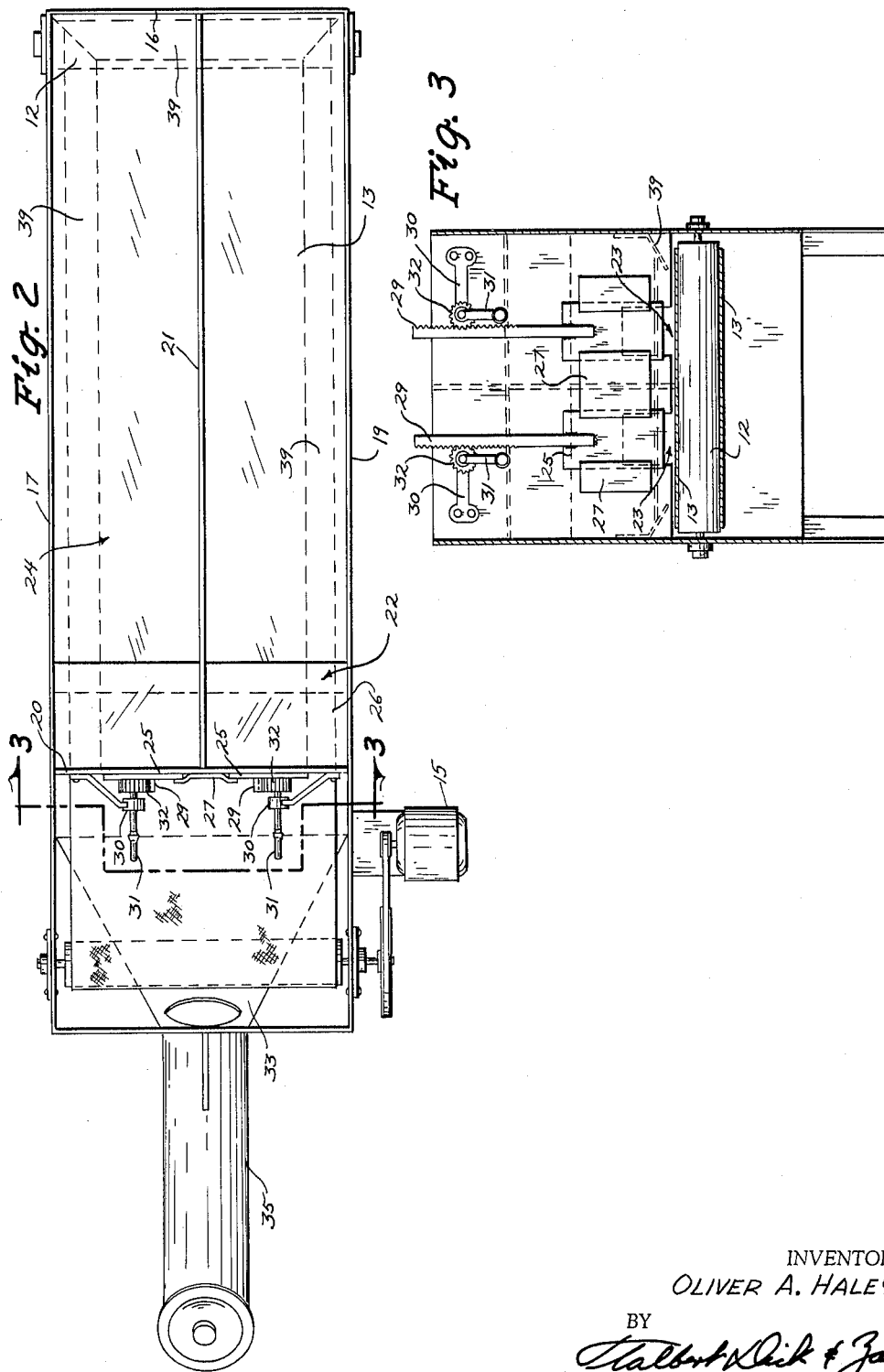

United States Patent Office 3,241,818
Patented Mar. 22, 1966

3,241,818
APPARATUS FOR SELECTIVELY ADJUSTABLY MEASURING THE VOLUME OF A PLURALITY OF MATERIALS
Oliver A. Haley, 720 14th St. Place, Nevada, Iowa
Filed Aug. 27, 1962, Ser. No. 219,478
4 Claims. (Cl. 259—22)

This application is a continuation-in-part of my co-pending application Serial No. 23,730 filed April 21, 1960, now abandoned.

This invention relates to a device that will selectively adjustably measure a plurality of granular or like materials and deposit them in a common receiving container.

The mixing of materials has always been a difficult task. The usual system has been to measure out the different materials, either by weight or volume, and then pour them into a common container for mixing. Obviously such a method is slow and not that of a continuous operation.

Therefore, one of the principal objects of my invention is to provide an apparatus that will measure and mix a plurality of materials in a continuous operation.

A further object of this invention is to provide a material mixing device that permits the independent volume adjustment for any one or all the materials being mixed.

A still further object of this invention is to provide a material measuring and mixing apparatus that when once adjusted for the relative volumes of the materials, will rapidly and successfully perform its task without close attention from the user.

A still further object of this invention is to provide means whereby the total weight of the material will be substantially held away from the belt conveying means.

A still further object of this invention is to prevent the material involved from inadvertently rolling under the metering gates.

Still further objects of my invention are to provide a material measuring and mixing device that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIGURE 1 is a side view of my device ready for use;

FIGURE 2 is a top plan view of my apparatus and more fully illustrates its construction; and FIGURE 3 is a front cross-sectional view taken on line 3—3 of FIGURE 2.

My device may be successfully used for measuring and mixing all types of granular or like materials. I find it particularly adapted for at least two general usages, i.e., the measuring and mixing of livestock feed, and the measuring and mixing of fertilizers.

In the drawings, I have used the numeral 10 to generally designate the frame. The numeral 11 designates an elongated horizontal platform on the frame. At each end of the platform 11 is a rotatably mounted endless belt or roller 12. The numeral 13 designates an endless belt embracing the two rollers 12 and the platform 11 as shown in FIGURE 1. At least one of those rollers is operatively connected to a prime mover such as an electric motor 15. By this construction when the motor is running the top area of the endless belt will move forwardly over the platform on the frame 10, and at the rear end of the belt is a back wall 16, and at each side of the endless belt is a side wall designated by the numerals 17 and 19, respectively. The numeral 20 designates a front wall located a distance back of the front end of the endless belt. Within these walls 16, 17, 19 and 20 (which form a rectangular frame) is one or more longitudinally extending spaced apart divider walls 21. Such divider or dividers terminate just above the endless belt and provide the bin areas 22 and 24. Any number of dividers may be used to produce any desired bin areas. In the forward wall 20 and communicating with each of these bin areas is a gate opening 23, each located in the lower area of the forward end area and communicating with the top of the endless belt. Each of these gate openings is closable by a vertically adjustable gate door 25. In each bin area is a baffle 26 positioned to extend downwardly and rearwardly from the back of the forward end wall to extend over the belt as it passes under the forward end of the box. These baffles terminate above the top of the endless belt at approximately the same height that the gate openings extend above the top of the belt as shown in FIGURE 1. A second baffle 26A extends downwardly and forwardly from the back wall 16 and terminates forwardly of and below the rearward end of baffle 26 at a point just above belt 13. The two baffles 26 and 26A are supported at their ends by walls 17 and 19. Obviously the different materials to be measured and mixed are placed separately in the respective bin areas. In the drawings and for illustration purposes, I illustrate only two bin areas. The gate doors 25 should be independently movably adjustable. I show them vertically slidably back of holding plate flanges 27 on the forward wall of the box. These plates may have graduation volume markings as shown in FIGURE 3. Any suitable means may be used to individually lower or raise and lock these gate valve doors 25. I, however, show a toothed bar 29 extending upwardly from each of the door gates. Adjacent the teeth of each bar is a bearing member 30 on the front wall of the box, rotatably carrying a crank arm shaft 31. Each crank arm shaft has a spur gear wheel 32 in mesh with the teeth of the bar adjacent to it. By this arrangement the crank arms may be manually rotated to lower or raise the gate doors and when the selected positions of the gate doors have been obtained, the gate doors will remain in locked positions until it is again desired to change the position of one or more of the gate doors. Obviously if one gate door is elevated to a height greater than another, a relatively greater amount of material from its bin will move out on the endless belt than the material that will move out on the belt from such other bin. Therefore, by the relative adjustment of the gate valve doors, any desired ratio of the materials may be automatically measured. After the materials move with the endless belt from the box and under the gate doors, they will be clear of the box hopper and will move together forwardly from the front wall. The travel of the materials will continue forwardly until they fall from the forward end of the endless belt into the V-shaped receiving compartments or hopper 33. Thus the measured amounts of the materials will be joined and partially mixed in the compartment 33. The materials will be further mixed together by the conveyor or elevator. I show an elevator or auger tube 35 communicating with the inside bottom of the compartment 33 as shown in FIGURE 2. Rotatably mounted in the tube 35 is an ordinary screw auger conveyer 36. This auger is operatively connected to a prime mover such as an electric motor 37. To use the device it is merely necessary to fill the bin areas with the respective materials to be measured and mixed, and turn on the two electric motors. The top of the endless belt will move forwardly carrying the various materials from their respective bins through the door openings.

As herebefore indicated the measured amounts of the individual materials will be regulated by the positions of the gate doors. To make the measurements accurate, however, the baffle members are most necessary. I have found that without these baffle plates, the materials will, by gravity, roll out (even without the endless belt movement) from under the gate doors, onto the forward top of the belt forward of the front box wall. Obviously, this is most objectionable and makes for most inaccurate measuring of the materials. However, by placing the baffle plates a substantial distance back of the door openings, the material between the baffles and front wall will only be approximately that of the height of the door openings, although the bin areas back of the baffle plates are filled with the materials as shown in FIGURE 1. The effectiveness of the baffle plate 26 is increased by having it extend downwardly and rearwardly as shown. The two baffles 26 and 26A act to prevent the total weight of the material in the box from resting on the belt 11. With the device running, the measuring of the various materials and the mixing of the same will be automatic and continuous. The sides of the box may extend beyond the front end wall of the box to guide the material forward of the front end wall into the receiving compartment 33. Downwardly and inwardly extending shield flanges 39 are secured to the inner sides of the rear end wall and side walls of the box to overlap the rear end and sides of the endless belt. The materials being measured and mixed are designated by the numeral 40.

Some changes may be made in the construction and arrangement of my apparatus for selectively adjustably measuring the volume of a plurality of materials without departing from the real spirit and purpose of my invention, and it is my intention to cover by my claims, any modified forms of structure or use of mechanical equivalents which may be reasonably included within their scope.

I claim:
1. A device of the class described,
a frame,
a box on said frame, having side walls, rearward and forward ends,
a plurality of material compartments in said box,
an opening in the bottom of said box,
a continuous belt mounted for rotation on said frame and positioned to pass under and forwardly of the opening in the bottom of said box, said box having downwardly and inwardly extending shield flanges secured to the inner sides of said rearward end and said side walls above said continuous belt,
power means on said frame for rotating said belt,
each of said compartments having a gate opening in the forward bottom end thereof,
a gate adjustably secured to said box adjacent each of said gate openings,
means on said box for adjustably securing said gates with respect to said gate openings,
a baffle plate extending downwardly and rearwardly over said belt from the inner side of the forward end of each of said compartments,
a second baffle plate extending forwardly and downwardly from the rearward end of said compartments to terminate at a point above said belt,
mixing means on said frame below the forward end of said belt to receive and mix materials carried by said belt from said compartments through said gate openings,
said mixing means including a hopper below the forward end of said belt,
an auger tube secured to the lower end of said hopper and extending upwardly and forwardly from said hopper,
an auger rotatably mounted in said tube,
and means on said frame for rotating said auger at times.

2. In a device of the class described,
a frame,
a box on said frame having forward and rearward ends,
a plurality of material compartments in said box,
an opening in the forward bottom portion of said box,
a continuous belt mounted for rotation on said frame and positioned to pass under and forwardly of the opening in the forward bottom portion of said box,
power means on said frame for rotating said belt,
said forward end of said box having a plurality of gate openings therein, each of said gate openings communicating with one of said material compartments,
a gate adjustably secured to the forward end of said box adjacent each of said gate openings,
means on said box for adjustably securing said gates with respect to said gate openings,
a first baffle plate extending downwardly and rearwardly over said belt from the inner side of the forward end of each of said compartments,
said first baffle plate having its lower end terminating above and rearwardly of said opening in the forward bottom portion of said box and above and rearwardly of said gate openings,
a second baffle plate extending forwardly and downwardly from the rearward end of said box in each of said material compartments, the lower end of said second baffle terminating above and rearwardly of the lower end of said forward end of said box and in a spaced relation thereto and terminating above said belt,
said second baffle plate having its lower end in a spaced relation with said rearward end of said box,
and mixing means on said frame below the forward end of said belt to receive and mix materials carried by said belt from compartments through said opening in the forward bottom portion of said box and said gate openings.

3. The structure of claim 2 wherein said mixing means includes a hopper below the forward end of said belt, and an auger means extending upwardly and forwardly from said frame, means on said frame for powering said auger means, wherein material falling from the forward end of said belt will drop into said hopper and be conveyed upwardly and forwardly into and by said auger means.

4. The structure of claim 2 wherein said mixing means includes a hopper below the forward end of said belt, an auger tube secured to the lower end of said hopper and extending upwardly and forwardly from said hopper, an auger rotatably mounted in said tube, and means on said frame for rotating said auger at times.

References Cited by the Examiner
UNITED STATES PATENTS

| 991,183 | 5/1911 | Thors | 198—64 |
| 1,419,946 | 6/1922 | Schaffer | 222—415 X |
| 1,519,340 | 12/1924 | Smith | 214—83.36 |
| 1,908,238 | 5/1933 | Hardinge | 222—415 X |
| 2,676,721 | 4/1954 | Hansen | 214—83.32 X |
| 2,741,401 | 4/1956 | Kehres et al. | 222—136 |
| 2,913,150 | 11/1959 | Seale | 222—415 X |

CHARLES A. WILLMUTH, *Primary Examiner.*